Apr. 24, 1923.

E. C. WEIDIG 1,453,216

PLANT RECEPTACLE

Filed Sept. 2, 1921

WITNESSES
Edw. Thorpe
S. W. Foster

INVENTOR
Eugene C. Weidig
BY
ATTORNEYS

UNITED STATES PATENT OFFICE.

EUGENE CHARLES WEIDIG, OF NEW ORLEANS, LOUISIANA.

PLANT RECEPTACLE.

Application filed September 2, 1921. Serial No. 497,892.

*To all whom it may concern:*

Be it known that I, EUGENE C. WEIDIG, a citizen of the United States, and a resident of New Orleans, in the parish of Orleans and State of Louisiana, have invented a new and Improved Plant Receptacle, of which the following is a full, clear, and exact description.

This invention relates to improvements in plant receptacles, and more particularly to pots, boxes, vases, and other similar receptacles which are ordinarily formed of sand and cement, commonly termed in the trade "concrete or cement pots," an object of the invention being to provide a baffled drain outlet in the bottom of the receptacle which will permit an excess of water to escape but which will hold back the earth in the receptacle.

Heretofore, pots and boxes of this character have been provided with unobstructed openings in the bottom thereof, through which quantities of the soil or earth are carried by the seepage of water, causing damage and injury to the plant or flower growing in the receptacle, and it is the purpose of my invention to provide a baffle in the outlet of such a receptacle which will allow for the necessary drainage, but which will prevent the seepage of earth.

With these and other objects in view the invention consists in certain novel features of construction, and combinations and arrangements of parts as will be more fully hereinafter described and pointed out in the claims.

In the accompanying drawings—

Figure 1:
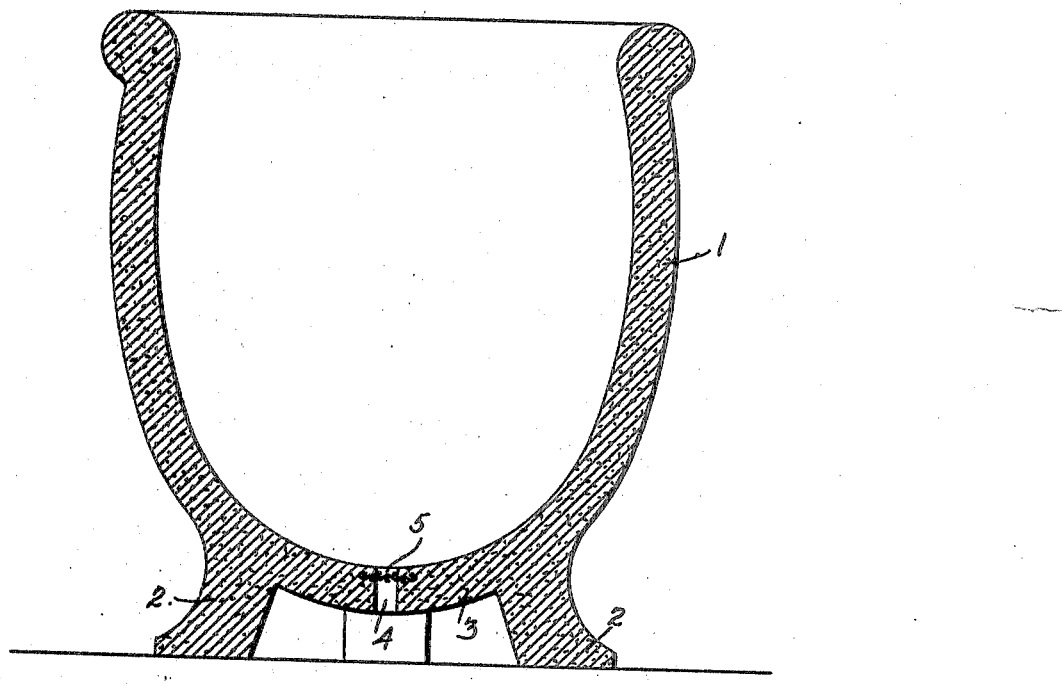
Figure 1 is a view in vertical section illustrating my invention in connection with one form of receptacle.
Figure 2:
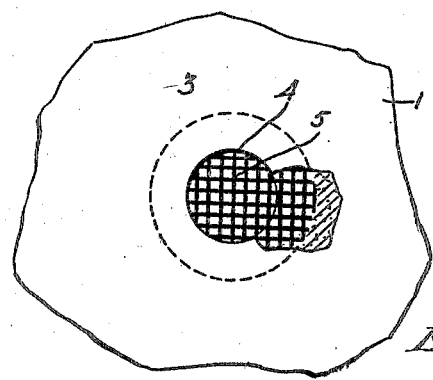
Figure 2 is a fragmentary plan view of the bottom of the receptacle with a portion broken away for clearness.

1 represents a receptacle, which may be composed of any suitable material, but which is preferably of a mixture of sand and cement, commonly known as "concrete."

The receptacle 1 may be of any shape, any design, any size, and of any material, and I have shown merely one form of receptacle for illustration only.

The receptacle 1 is preferably provided with feet 2 which support the bottom 3 at an elevation and this bottom 3 is formed with an opening 4 through which the excessive moisture can drain. Across this opening 4 I provide a baffle 5. This baffle 5 may be of various forms, and while I have illustrated a wire mesh or screen, it is obvious that it might be of other construction. The baffle 5, it is to be understood, may be made of some material which will not rust and which will resist the action of the water and the earth and is preferably formed or embedded in the material of the receptacle when the latter is molded so that the edges of the baffle are anchored in the material of the receptacle and cannot become accidentally dislodged.

In operation, the baffle permits the excess of moisture to escape but holds back the soil or earth so as to prevent seepage of earth through the outlet.

Various slight changes might be made in general form and arrangement of the parts described without departing from the invention, and hence I do not limit myself to the precise details set forth, but consider myself at liberty to make such changes and alterations as fairly fall within the spirit and scope of the appended claims.

I claim:

1. As a new article of manufacture, a plant receptacle having a drain opening in its bottom and provided with a piece of foraminous material embedded in the bottom and extending across the said opening.

2. A receptacle of the character described having an opening in its bottom, and a wire mesh screen located across the opening and having its edges embedded in the material of the receptacle.

EUGENE CHARLES WEIDIG.